United States Patent [19]

Book et al.

[11] Patent Number: 4,653,445
[45] Date of Patent: Mar. 31, 1987

[54] ENGINE PROTECTION SYSTEM

[76] Inventors: Anton M. Book, #29 - 150 E. Queens Rd., North Vancouver, British Columbia, Canada, V7N 1G6; Robert J. Wiggins, 102 - 5217 Clinton, Burnaby, British Columbia, Canada, V5J 2L7; Alan D. Fonseca, 1126 Keith Rd., West Vancouver, British Columbia, Canada, V7T 1M8

[21] Appl. No.: 843,977

[22] Filed: Mar. 25, 1986

[51] Int. Cl.$^4$ .............................................. F02B 77/08
[52] U.S. Cl. .......................... 123/198 DC; 123/198 D
[58] Field of Search .... 123/198 D, 198 DC, 198 DB, 123/196 S, 41.15

[56] References Cited

U.S. PATENT DOCUMENTS

| | | | |
|---|---|---|---|
| 3,602,207 | 8/1971 | Kilmer | 123/198 D |
| 3,914,735 | 10/1975 | Guillaume | 123/198 D |
| 4,019,489 | 4/1977 | Cartmill | 123/198 D |
| 4,088,110 | 5/1978 | Sperline | 123/198 DC |
| 4,147,151 | 4/1979 | Wright | 123/198 DC |
| 4,246,493 | 1/1981 | Beeghly | 123/198 DC |
| 4,429,670 | 2/1984 | Ulanet | 123/198 DB |
| 4,475,498 | 10/1984 | Hurner | 123/198 D |
| 4,509,480 | 4/1985 | Kull et al. | 123/198 D |
| 4,574,752 | 3/1986 | Reichert, Jr. et al. | 123/198 DB |

*Primary Examiner*—Ira S. Lazarus
*Attorney, Agent, or Firm*—Klarquist, Sparkman, Campbell, Leigh & Whinston

[57] ABSTRACT

A control system for protecting an internal combustion engine is disclosed. The system comprises input receiving means for receiving a plurality of warning signals, each representing a fault condition, and signal processing means for producing an engine shutdown command signal. The signal processing means includes means for classifying any received warning signal as one requiring a fast shutdown response or a delayed shutdown response.

7 Claims, 10 Drawing Figures

ENGINE PROTECTION SYSTEM

FIELD OF THE INVENTION

This invention relates to control systems for the protection of internal combustion engines.

BACKGROUND TO THE INVENTION

The need to protect internal combustion engines from damaging or destructive operating conditions is well known. Such need can become particularly important in the case of high performance engines which not only themselves may be costly and expensive to maintain, repair or replace, but which may also be used to operate sophisticated and costly equipment, the downtime and repair of which is preferably kept to a minimum.

Various devices or systems for the protection of internal combustion engines are known in the prior art. Some of such devices are essentially dedicated to a single task; for example, the tilt detector disclosed in U.S. Pat. No. 3,882,957 (Fritz) entitled "Vehicle Roll-Over Protection Device", granted on May 13, 1975. Here, a tilt detecting apparatus was designed to effect vehicle engine shutdown if the vehicle rolled over or tilted more than a predetermined amount.

Other known sensing or detecting devices which may be used to monitor and sense engine operating conditions or its immediate environment include devices for monitoring and sensing conditions or parameters such as engine or other temperatures, oil pressures, rpms, water, fuel (fuel leakage), fluid levels (water or other coolant), fire, and so forth. Signalling from such devices may readily be utilized to effect engine shutdown based upon the presence or absence of a signal having a magnitude above or below a predetermined threshold value.

In contrast to devices or systems dedicated to a single task, some known engine protection devices or systems are designed to effect engine shutdown if any one of more than one of the previously described devices or systems, operating concurrently to control a particular engine, produces a signal that dictates engine shutdown. An example of such a system is disclosed in U.S. Pat. No. 4,429,670 (Ulanet) entitled "Engine Protection Systems", granted on Feb. 7, 1984. As described in the patent to Ulanet, his system includes visual and audible signals responsive to operative conditions of at least a coolant level, engine temperatures, high and low oil pressures, and air intake pressures. If an operative condition endures for a period of time determined by the passage of current through a circuit breaker, engine shutdown is effected by tripping current to the solenoid of an engine fuel valve.

The ability of an engine protection system to respond to more than one sensed operating or environmental condition is a desirable feature. In practical terms, any one of such conditions may represent a threat to an engine or its associated equipment. To afford protection against only one condition is limiting and may be considered inadequate for many applications. However, known systems that are designed to respond to any one of a plurality of sensed operating conditions generally fail to distinguish any one threatening condition from the next, and generally fail to recognize that the control and response of the system may preferably or advantageously depending upon the character of particular threatening conditions. For example, in the case of the system disclosed by Ulanet, there is essentially a series connection of switches, the opening of any one of which will initiate the same control regime leading up to engine shutdown, viz. current through a circuit breaker which, if not manually overridden and allowed to endure for a predetermined period of time, will ultimately trip the breaker and current to a fuel valve as noted above. The timing of engine shutdown control is essentially fixed.

SUMMARY OF THE INVENTION

The present invention recognizes that the response of a control system for engine protection to different threatening conditions should not always be the same. At the same time, the present invention recognizes that the facility to respond differently to different conditions should not detract from the object of an integrated system which may be made compact, which is flexible in its application, and which is relatively easy to instal and maintain.

To such ends, the present invention provides a control system for protecting an internal combustion engine, the system comprising input receiving means for receiving a plurality of warning signals, each of which warning signals represents the presence or absence of a fault condition causing or which may cause damage to the engine, and signal processing means operatively connected to the input receiving means for conditionally producing an engine shutdown command signal. The signal processing means includes means for classifying any such warning signal as one requiring generation of the engine shutdown command in relatively fast respone to the warning signal or as one requiring generation of the engine shutdown command only in delayed response to the warning signal.

For example, fast response may be dictated if a warning signal represents a fire, the presence of combustible gas or fuel, roll-over or excessive tilt. Likewise, manual actuation of an operator's key or shut-off switch may equated as a warning signal dictating a fast response. On the other hand, delayed response may be desirable in some situations—for example, if the warning signal represents low oil pressure or low coolant level, engine overheating, or engine overspeed. In such situations, a delayed response enables the opportunity for operator intervention.

Preferably, a control system in accordance with the present invention includes means for manually overriding the generation of an engine shutdown command during a period of delayed response to a warning signal. Typically, the period of a delayed response may be of the order of about 15 seconds thereby enabling a reasonable opportunity for operator intervention (which is in contrast to a typical fast response that may be of the order of 2 seconds or less). The fact that a delayed response period is in progress may be indicated to an operator by visible and audible warnings.

In a preferred embodiment of the present invention, the input receiving means includes means for producing a latched signal representing the occurence of a fault condition if a received warning signal endures for a preselected period of time. In situations of fast or delayed response to the occurence of such a latched signal, depending on the classification of the warning signal, the signal processing means produces the engine shutdown command. This feature is a debounce feature designed to guard against the possibility of false warning signals. It requires the warning signal to endure for a minimum time before the system will recognize the signal as a true warning signal. Typically, this minimum time may be of the order of ½ to 1½ seconds.

Advantageously, fast and delayed response to warning signals may be achieved by a timing means which not only serves to generate an engine shutdown command signal in fast or delayed response to a received (true) warning signal, but also to sustain the command signal for a predetermined period of time thereafter. A sustained shutdown command signal is considered desirable in some applications—particularly those where complete engine shutdown may not be achieved by a momentary command signal. For example, in some applications, the closure of a fuel valve for a short period of time may not reliably ensure complete shutdown. Fuel leakage through the valve may cause the engine to continue to run for a significant period of time. In such situations, it is considered that an engine shutdown command signal should endure for a relatively lengthy period of time, for example, of the order of 40 seconds.

The fast or delayed response of such timing means to a received warning signal is preferably achieved by timing means which has selectable first and second starting conditions, the first of which is operatively selected in response to a received warning signal requiring immediate engine shutdown, the second of which is operatively selected in response to a received warning signal not requiring immediate engine shutdown. Such selectable control may readily be achieved with the use of a digital clock and counter (or shift register) the latter of which is loaded or preset to commence counting from a selected count, the selected count being the starting condition determined by classification of the warning signal.

A control system in accordance with the present invention may include controlled switching means for connecting and disconnecting the system with an external source of electrical power. Advantageously, the foregoing timing means is operatively interconnected with such switching means so as to effect electrical disconnection of the system upon termination of an engine shutdown command signal. Such a feature is considered desirable because continuing energization of the system following engine shutdown may itself present a hazard in some situations—for example, where an electrical short may ignite fuel.

Various features may be implemented in conjunction with a control system in accordance with the present invention. For example, in vehicular applications, the control system may include a tilt detector as a built in part of the system. Also, in vehicular applications, the system may include an input for receiving a signal that will automatically cause an engine shutdown command to be overridden if the vehicle is in motion. Vehicle motion detectors are well known (for example, in cruise control applications) and their utilization to provide a control input to the present invention may be desired especially in situations where the consequence of engine shutdown during vehicle motion could be more serious than any damage to the engine per se that might otherwise occur.

The particular means for producing various kinds of warning signals are not considered to be a part of the present invention. Likewise, the particular means and methods of utilizing the engine shutdown command signal to effect engine shutdown is not considered to be a part of the present invention. The engine shutdown command signal is itself an electrical signal, but how it is used to cause engine shutdown will depend on the application. For example, in the case of a diesel engine, the signal may be utilized to control a fuel shut-off, either by the fuel rack or governor of an engine, or by placing an electro-mechanical switch in the fuel supply line. Alternately, the signal may be utilized to activate an air flow restrictor or gate valve often found mounted between the air filter and air intake manifold of the engine.

DETAILED DESCRIPTION

Figure 1:
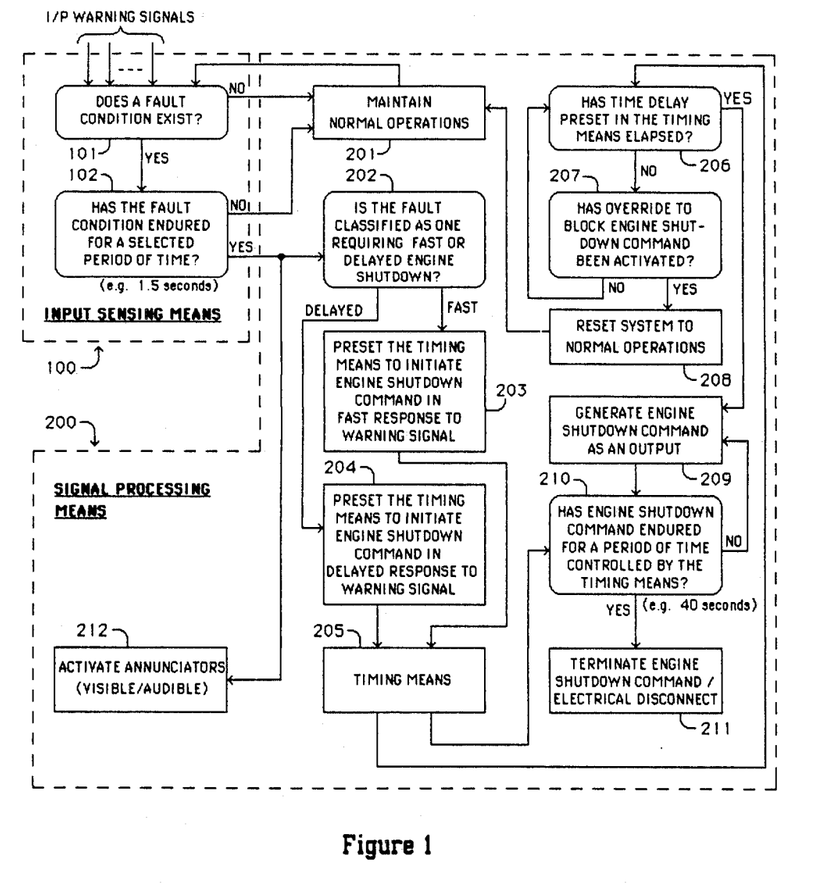
FIG. 1 is a system flow diagram for an engine protection system in accordance with the present invention.

The system flow diagram of FIG. 1 is a substantially self-contained description of an engine protection system in accordance with the present invention, such diagram illustrating a system for receiving a plurality of input warning signals and for producing in controlled response thereto an engine shutdown command signal. As will be apparent, the system illustrates many of the features discussed above.

As can be seen in FIG. 1, the input warning signals are received by a contol block 101 of an input sensing means generally designated 100. Block 101 determines whether a fault condition exists. If a fault is sensed, and if the fault has endured for a selected period of time as determined by control block 102, then the system flow passes to block 202 of signal processing means generally designated 200. If no fault is sensed, or if any fault sensed has endured for less than the selected period of time, then the system flow passes to block 201 of signal processing means 200.

The selected period of time determined by block 202 is relatively short—for example, 1.5 seconds. This provides the debounce feature discussed above and guards against the possibility of false warning signals.

When system flow passes to block 201, then normal operations are maintained, including a continuing determination of whether any fault condition exists. This is indicated in FIG. 1 by system flow from block 201 back to block 101.

As can be seen in FIG. 1, when system flow passes to block 202, it also passes to control block 212 to activate visible and/or audible annunciators. Obviously, the purpose is to provide suitable warning to an operator that a fault has occurred.

If control block 202 determines that a fault is one requiring a fast response, then timing means 205 if preset by control block 203 to initiate engine shutdown in fast response to the warning signal. As indicated above, a typical fast response may be 2 seconds or less. On the other hand, if control block 202 determines that a fault condition is one not requiring a fast response, then timing means 205 is preset by control block 204 to initiate engine shutdown in delayed response to the warning signal. Here, and again as indicated above, a typical delayed response may be of the order of 15 seconds.

Control block 206 itself performs a timing function and determines whether the time delay (fast or delayed) preset in timing means 205 has elapsed. If it has, then system flow proceeds to block 209 which generates an engine shutdown command as an output. Control block 210 likewise performs a timing function and determines whether an engine shutdown command has endured for a period of time controlled by the timing means. To better ensure complete engine shutdown, this period of time is relatively lengthy, for example 40 seconds. As indicated by contol block 211, the engine shutdown command is terminated after the controlled period and, at the same time, the system is electrically disconnected.

During the time delay preceding an engine shutdown command, control block 207 determines whether an override to block an engine shutdown command has been activated. If there is an override, then system flow passes to block 208 which resets the system to normal operations—passing flow back to block 201 and then to block 101. If the fault that initiated the overridden shutdown command is still present as an input warning signal, then the cycle will begin once again.

Figure 2:
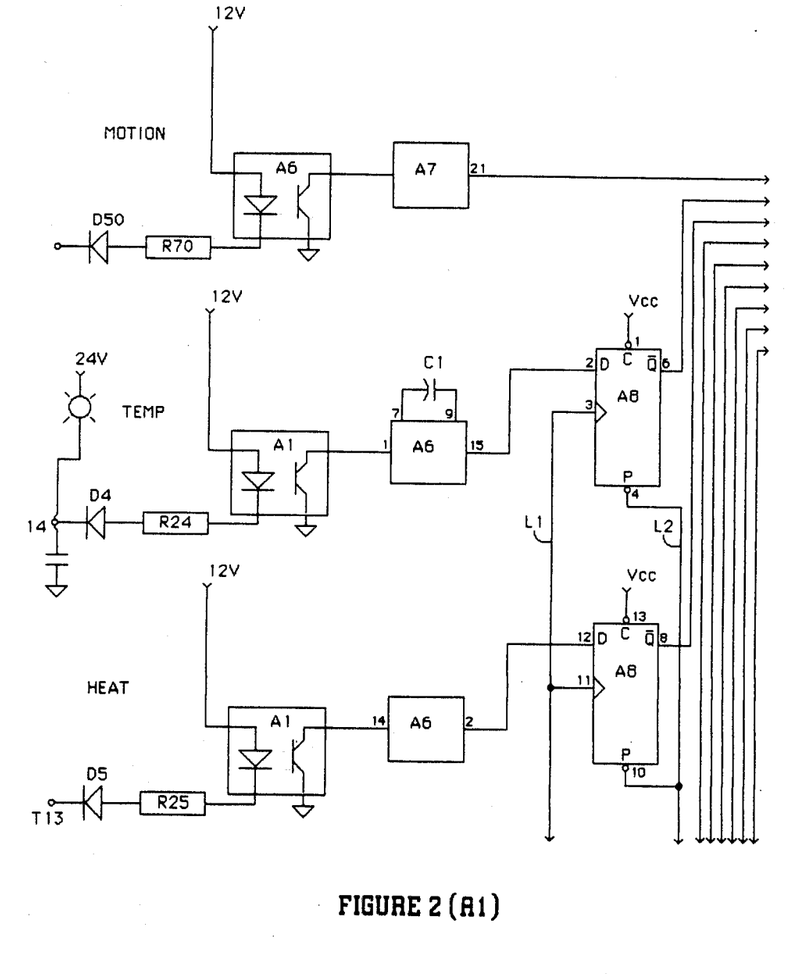
FIG. 2 consisting of parts 2(A1) to 2(A3), 2(B1) to 2(B3), 2(C1), 2(C2) and 2(D1), is a circuit diagram showing input receiving means and signal processing means in accordance with the present invention.

The circuit diagram of FIG. 2 consists of 9 parts, namely parts 2(A1) to 2(A3), 2(B1) to 2(B3), 2(C1), 2(C2) and 2(D1). In appreciating the composite diagram represented by these parts, it may assist the reader to align the parts in a gridwork formed by four horizontal rows A1-A3, B1-B3, C1-C2 and D1, and three vertical columns A1-D1, A2-C2 and A3-B3.

The circuit of FIG. 2 consists of commercially available circuit components and will be readily understood by those skilled in the art. Standard nomenclature is used wherein components labelled alphanumerically beginning with the letter "A" are integrated circuit components for performing the function represented by the nomenclature, or the function described below in more detail. In many cases, it will be noted that there are repetitions of components bearing the same alphanumeric nomenclature—for example, four occurences of gate A20. According to convention, this simply indicates that the components are a part of the same integrated circuit chip. However, so as to differentiate such parts, differing one or two digit numerals representing pin connections of the chip appear at the input and output connections of the parts.

Where a circuit line bears a label such as A18-6 or A26-5 this simply means that the line connects to or from component A18, pin 6 or component A26, pin 5, as the case may be.

Through optical isolating and debounce circuitry represented by components A1 to A7, the circuit is designed to receive a plurality of input warning signals corresponding to sensed TEMPERATURE, HEAT, OVERSPEED, ENGINE OIL, FIRE, TILT, GAS, and KEY, the KEY input being an operator key, switch or the like. As well, the system includes provision for receiving input signals corresponding to sensed MOTION, OVERRIDE and START, the OVERRIDE and START inputs being controlled externally by an operator switch or the like. These input paths may be seen in parts A1, B1, C1 and D1. Typically, all such inputs may be sensed from an engine operated vehicle.

Devices and componentry for providing such input signals are not shown because the various signals indicated may be generated in various known ways. In FIGS. 2(A1) to 2(A3), 2(B1) to 2(B3), 2(C1), 2(C2) and 2(D1), the particular input signals that appear are basically intended to shown the variety of input signals that may be utilized with an engine protection system in accordance with the present invention. However, in particular applications, it will be readily appreciated that engine shutdown control may be achieved with only some of the indicated signals or other signals representative of external parameters or functions that are not indicated in FIGS. 2(A1) to 2(A3), 2(B1) to 2(B3), 2(C1), 2(C2) and 2(D1).

As may seen in parts FIGS. 2(A3) and 2(B3), the circuit of FIG. 2 provides a plurality of output signals designated as MOTION, TEMPERATURE, HEAT, OVERSPEED, ENGINE OIL, FIRE, TILT, GAS, HYDRAULIC OIL, BUZZER, SHUTDOWN, ELEC. SOL., RIG SAVER AND GOV. FUEL SOLENOID, each of such outputs being taken through transistor output driver stages.

When they occur, the outputs for TEMPERATURE, HEAT, OVERSPEED, ENGINE OIL, FIRE, TILT, GAS, HYDRAULIC OIL, BUZZER and SHUTDOWN will be intermittent signals pulsed by clock signal CLK1. As such, they may be used to drive a visual display and, in the case of the BUZZER output, audible annunciators. The pulsating character of these signals will indicate an abnormal status. The output for MOTION may likewise be used to drive a visual annunciator. However, since motion is not necessarily representative of abnormal status, the output is constant (it is not pulsed by CLK1).

The outputs identified as ELEC. SOL., RIG SAVER and GOV. FUEL SOLENOID are solenoid drivers used to drive external solenoids (not shown).

The output identified as LOGO is an uncontrolled line which may serve as a grounding path whenever the system is energized—for example as a path in a circuit to illuminate a fixed display or indicator that the system is energized.

The structure and function of the circuitry and circuit elements shown in FIG. 2 will now be described in more detail.

(1) Diodes D4 to D8, D50 (see parts 2(A1), 2(B1), 2(C1), and 2(D1) of FIG. 2)

These are blocking diodes included to protect optical isolators in the event that an excessive reverse voltage is connected to an input terminal.

(2) Resistors R24, R25, R26, R27, R29, R30, R31, R33, R34, R36, R70 (see parts 2(A1), 2(B1), 2(C1) and 2(D1) of FIG. 2)

These are resistors utilized to limit input current to a level that is safe and commensurate with the requirements of the optical isolating circuitry shown in FIG. 2 that will carry input current.

(3) Resistors R28, R32, R35 (see parts 2(B1), 2(C1) and 2(D1) of FIG. 2)

These are current limiting resistors to be utilized in series connection with resistors R29, R33 and R36, respectively, in the event that the system voltage used to generate input current is relatively high. In other words, as shown in FIG. 2, one of two input configurations may be selected for sensed inputs corresponding to FIRE, TILT and START. The selected configuration will depend upon whether the external driving voltage is relatively low or relatively high.

(4) Optical Isolating and Bounce Eliminating Circuitry A1 to A6, A7; timing capacitors C1, C2 (see parts A1, B1, C1 and D1 of FIG. 2)

The purpose of this circuitry is to isolate the circuit inputs from transient voltages and to eliminate false triggering due to contact bounce or vibration. Timing capacitor C2 also provides clock signal CLK0.

(5) Inverter A26 and Jumper J1 (see FIRE input in FIG. 2(B1)).

This circuitry allows selection for normally open or normally closed contacts at the sensed input corresponding to FIRE. Typically, current will flow at this input if terminal T8 is grounded by an external contact closure (not shown).

(6) Flip Flops A8 to A11 (see parts 2(A1), 2(B1) and 2(C1) of FIG. 2)

These flip flops provide latched output status signals in response to corresponding sensed input signals from the optical isolating and debounce circuitry. As will be apparent, in order to achieve a latched warning signal from the output of one of the segments of flip flops A8 to A11 a sensed input warning signal must endure for a length of time sufficient to trigger the segment. When such latching occurs, the flip flop output is taken as a "true" warning that a fault condition exists.

(7) Gate A13 (see FIG. 2(A2))

This gate provides an output active low upon the occurence of a true warning signal.

(8) Gate combination A14 and A15 providing SHUTDOWN signal as shown in FIG. 2(B2)

This circuitry is designed to provide for immediate engine shutdown if a sensed input signal corresponds to FIRE, TILT, GAS or KEY. The output at A14-10 will be active high. Typically, with the possible exception of a sensed input signal corresponding to KEY, any one of these signals will represent a serious and immediate hazard. A KEY signal, being manually controlled by an operator may or may not represent the presence of some hazard, but it nevertheless indicates an immediate desire for engine shutdown. In effect, this circuitry is performing a classification function by distinguishing warning signals requiring immediate engine shutdown from those that do not.

(9) Gate A14 receiving inputs SOL and CLK2 as shown in FIG. 2(B2)

When enabled, this gate provides clock signal CLK2 to control the clocking and loading of shift register (counter) A22.

(10) Gates A29 as shown in FIG. 2(A2)

The output at A29-11 provides an enabling signal to count loading (flip flops A16) and counting (counter A22) circuits. Engine shutdown sequence will be initiated only if gate A13 described above is activated and vehicle is not in MOTION or TILTed.

(11) Flip Flops A16 as shown in FIG. 2(B2)

The output at A16-8 is a command to load counter A22 with the count determined by the output at A14-10.

(12) Shift Register (Counter) A22 as shown in FIG. 2(B2)

Counter A22 provides a clock signal at A22-15 on line L4 to pins 3 and 5 of A17 (flip flops shown in FIG. 2(C2). It provides time delays of about 15 seconds for delayed shutdown response and about 40 for sustaining a shutdown command.

The particular counter A22 utilized in the circuit of FIG. 2 is an integrated circuit commercially available from Motorola (Motorola MC14161BCP).

(13) Gate A23 receiving KEY input as shown in FIG. 2(A2)

The signal output at A23-4 acts to disable the BUZZER output (FIG. 2(B3)) on a KEY input.

(14) Flip Flop A17 (section comprising pins 1 to 6)

As may be seen from FIGS. 2(C2) and 2(B3), this section of A17, receiving an input from counter A22 on line L4, provides an output to the SHUTDOWN display output through a flip flop section of A28 (viz. on line A28-9). It also provides an output at A17-6 to energize the FUEL SOLENOID output shown in FIG. 2(B3) and an input to a second flip flop section of A17 described below for the next step in an engine shutdown sequence. The FUEL SOLENOID output may be utilized to operate a variety of known fuel shut-off mechanisms.

(15) Flip Flop A17 (section comprising pins 8 to 13)

On the second pulse from counter A22, this flip flop provides the signal SOL shown in FIG. 2(C2) which disables clock signal CLK2 at A14-11 (input to counter A22). Also, this flip flop disables the clock to flip flops A8 to A11. Further, this flip flop provides a clock input at A21-12 (for direction to an Electrical Disconnect Solenoid via the ELEC. SOL. output). As will be appreciated, the entire engine system may have a source of DC power such as a battery. As a safety measure, the power source may be electrically disconnected at the end of a shutdown sequence utilizing the ELEC. SOL. output to trip a high current breaker or relay (not shown).

(16) Gate A21 (section comprising pins 11 to 13) and Flip Flop A28 (section comprising pins 1 to 6) as shown in FIG. 2(C2)

When engaged, gate A21 at pin 11 provides an input signal to flip flop section A28, pin 3. Jumpers are to allow non-immediate shutdown inputs to allow option of not disconnecting external Electrical Solenoid and visual display (the latter of which are external to the circuit of FIG. 2 and are not shown).

(17) Gate A21 (section comprising pins 8 to 10) and Gate A23 (section comprising pins 2, 9 and 10) as shown in FIG. 2(C2)

The output at A23-10 activates the RIG SAVER output shown in FIG. 2(B3) in response to an output at A17-5, but, unlike the FUEL SOLENOID output, also depends on the status of the KEY input.

(18) Gates A27 and A14 as shown in FIG. 2(C2)

These gates form a logic circuit to disable CLK0 on line L1 to flip flops A8 to A11 if any input has been activated or the START input has not been activated.

(19) MOTION input and output circuits as shown in FIGS. 2(A1) and 2(A3)

A signal at A7-11 indicates that the vehicle is in motion. This signal is provided as an input at A29-2 (FIG. 2(A2)) referred to above and is also provided as an input at A29-8,9 (FIG. 2(A3)) for visual display.

(20) Output Drive Circuitry (parts 2(A3) and 2(B3) of FIG. 2)

Upon the occurence of any one of the inputs MOTION through KEY as appear in part 2(A1), 2(B1) and 2(C1) of FIG. 2, there will be an output drive through a corresponding output transistor Q1 to Q8, or Q14, as the case may be. As can be seen these outputs are taken through current limiting resistors. As noted above (with the exception of the MOTION output), these outputs are pulsed by a clock signal CLK1. Such signal is generated by the clock circuit comprising inverter A25, resistor R42 and capacitor C8 shown in FIG. 2(B3). Thus, both a clock signal and a true warning signal must be present at the input of a gate segment A19, A20 in order to drive the corresponding output transistor.

(21) Voltage Regulator (see FIG. 2(B3)

The regulator shown provides a stable supply voltage Vcc (e.g. 8 volts from the indicated 12 volt source) for operation of integrated circuits which form part of the overall circuit of FIG. 2. Diode D3 prevents rapid discharge at the output of the regulator when system power is shut off and provides protection to A12 flip flop segments referred to below.

(22) Clock CLK2 (see FIG. 2(A2))

The circuitry generating clock signal CLK2 controls shift register (counter A22) and the sequence of shutdown.

(23) Flip Flop A12 (section comprising pins 1 to 6), capacitor Cx, R37, R39, gates A27, all as shown in FIG. 2(D1)

Generally, this section generates a pulse of 15 seconds duration when an OVERRIDE signal ceases (e.g. when a manual override button providing an external contact closure (not shown) is released). However, gate circuitry A27 will OVERRIDE on an immediate engine shutdown.

(24) Flip Flop A12 (section comprising pins 11 to 15), capacitor Cy, R38 and R40 as shown in FIG. 2(D1)

This section generates a pulse of 15 seconds duration when a START signal ceases (e.g. when a manual start switch providing an external contact closure (not shown) is released). Note that the output at A7-4 not only provides an input at A12-11 through A25-11, but also provides a reset signal (SOLSET) to A17-10.

(25) Gate A15 (pins 10 to 13), R47, C5, A15 (pins 12-13), R44 and LED D1

This section provides a visual indicator and a reset signal when OVERRIDE is engaged to reset counter A22, or on START for time during engine cranking plus 15 seconds to disarm all inputs to prevent any shutdowns.

(26) Flip Flop A18 (section comprising pins 8 to 13) as shown in FIG. 2(B2)

This section will allow a KEY shutdown to activate the ELEC. SOL. output.

(27) Gate A25 (pins 1,2), R43 and C9 (see FIG. 2(B2))

Used to provide power to system via double contact pushbutton (not shown).

(28) Gates A23 (pins 11 to 13), A15 (pins 3 to 6) and A25 (pins 3,4) as shown in FIG. 2(B2)

This circuitry provides a reset on line L2 when power is turned on or on reset from A18-5. A reset from A15-6 is provided when power is turned on, or on reset from A18-5, or signal from A16-9 that load sequence is completed. A reset is provided at A25-4 on line L3 only when power is turned on.

It will be clear to those skilled in the art that a wide variety of circuit structures may be devised to implement the control functions performed by the circuit of FIG. 2, and to achieve the system functions shown in the flow diagram of FIG. 1. The particular circuitry or other means that may be utilized to provide an engine protection system in accordance with the present may vary considerably but remain within the scope of the following claims.

We claim:

1. A control system for protecting an internal combustion engine, said system comprising:
   (a) input receiving means for receiving a plurality of warning signals, each warning signal representing a fault condition causing or which may cause damage to said engine; and,
   (b) signal processing means operatively connected to said input receiving means for producing an engine shutdown command signal, said signal processing means including means for classifying any received warning signal and
      (1) for producing said shutdown command signal in fast response to such received warning signal if such warning signal is classified as corresponding to a fault condition requiring immediate engine shutdown; and,
      (2) for producing said shutdown command signal in delayed response to such received warning signal if such warning signal is classified as corresponding to a fault condition not requiring immediate engine shutdown.

2. A control system as defined in claim 1, wherein said input receiving means includes means for producing a latched signal representing the occurence of a fault condition if a received warning representing such fault condition endures for a preselected period of time, said signal processing means for receiving such latched signal and for producing said engine shutdown command signal in fast or delayed response thereto.

3. A control system as defined in claim 2, including means for manually overriding the production of said engine shutdown command signal during a period of such delayed response and, upon the occurence of such override, for delatching said latched signal.

4. A control system as defined in claim 1, wherein said signal processing means includes timing means for generating said engine shutdown command signal in fast or delayed response to a received warning signal, and for sustaining such command signal for a predetermined length of time thereafter.

5. A control system as defined in claim 4, wherein said timing means has selectable first and second starting conditions, the first of which is operatively selected in response to a received warning signal requiring immediate engine shutdown, the second of which is operatively selected in response to a received warning signal not requiring immediate engine shutdown.

6. A control system as defined in claim 1, 2, 4 or 5, including means for manually overriding the production of said engine shutdown command signal during a period of such delayed response.

7. A control system as defined in claim 4 or 5, including controlled switching means for connecting and disconnecting said system with an external source of electrical operating power, said timing means interconnecting with said switching means and controlling same to electrically disconnect said system from said external source of power upon termination of an engine shutdown command signal.

* * * * *